United States Patent
Bowman

Patent Number: 5,627,886
Date of Patent: May 6, 1997

[54] SYSTEM AND METHOD FOR DETECTING FRAUDULENT NETWORK USAGE PATTERNS USING REAL-TIME NETWORK MONITORING

[75] Inventor: William B. Bowman, Herndon, Va.

[73] Assignee: Electronic Data Systems Corporation, Plano, Tex.

[21] Appl. No.: 528,746

[22] Filed: Sep. 15, 1995

Related U.S. Application Data

[63] Continuation of Ser. No. 311,614, Sep. 22, 1994, abandoned.

[51] Int. Cl.$^6$ .......................... H04M 15/00; H04M 3/00
[52] U.S. Cl. .......................... 379/111; 379/145; 379/189
[58] Field of Search .......................... 379/144, 145, 379/188, 189, 111, 112, 113, 133

[56] References Cited

U.S. PATENT DOCUMENTS

| | | | |
|---|---|---|---|
| 5,335,265 | 8/1994 | Cooper et al. | 379/62 |
| 5,335,278 | 8/1994 | Matchett et al. | 379/59 |
| 5,345,595 | 9/1994 | Johnson et al. | 379/60 |
| 5,351,290 | 9/1994 | Naeimi et al. | 379/145 |

FOREIGN PATENT DOCUMENTS

0583135A2  2/1994  European Pat. Off. ......... H04M 3/38

*Primary Examiner*—Stephen Chin
*Assistant Examiner*—Kevin Kim
*Attorney, Agent, or Firm*—L. Joy Griebenow

[57] ABSTRACT

A computerized system and method for detecting fraudulent network usage patterns using real-time network monitoring of at least two disparate networks is shown which receives at least one event record from each of the disparate networks, analyzes each of the received event records to determine its type based on user-defined parameters, identifies predetermined fields in the analyzed event record to be used as keys, measures network usage associated with the key, summarizes usage statistics against at least of the keys, compares statistic totals to predefined thresholds, and responds with an alarm or the like when the thresholds are met or exceeded.

17 Claims, 3 Drawing Sheets

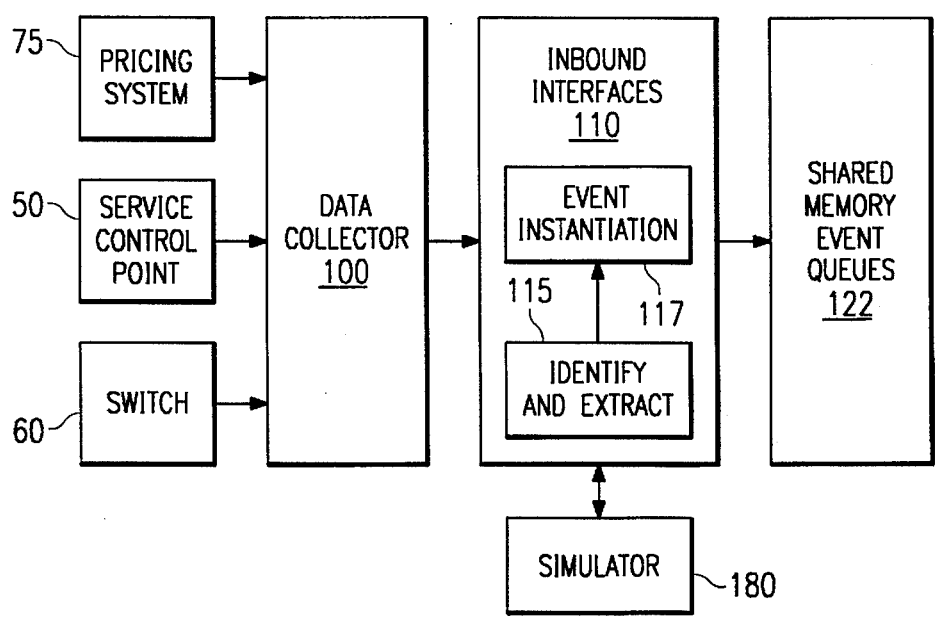

| the value of <field name> | (Pick one; delete non-applicable phrase) | <Value Specification> |
|---|---|---|
| Originating Country | X [Is/~~is not~~] in the list<br>☐ Falls [within/outside] the range<br>☐ [Begins/does not begin] with the pattern | 502,505 |

FIG. 4b

| the value of <field name> | (Pick one; delete non-applicable phrase) | <Value Specification> |
|---|---|---|
| Event Start Time | ☐ [Is/is not] in the list<br>X Falls [~~within~~/outside] the range<br>☐ [Begins/does not begin] with the pattern | Lower limit: 08:00:00<br>Upper limit: 18:00:00 |

FIG. 4c

| the value of <field name> | (Pick one; delete non-applicable phrase) | <Value Specification> |
|---|---|---|
| Called Number | ☐ [Is/is not] in the list<br>☐ Falls [within/outside] the range<br>X [Begins/~~does not begin~~] with the pattern | 1809* |

SYSTEM AND METHOD FOR DETECTING FRAUDULENT NETWORK USAGE PATTERNS USING REAL-TIME NETWORK MONITORING

This application is a continuation of application Ser. No. 08/311,614, filed Sep. 22, 1994 now abandoned.

BACKGROUND OF THE INVENTION

1. Field of the Invention

The present invention relates generally to fraud detection systems, and more particularly to a system and method for detecting fraudulent network usage patterns by using real-time network monitoring.

2. Description of the Related Art

In the telecommunications arena, fraud opportunities are increasing due to the expansion of network-based products and new service offerings. Perpetrators of fraud take advantage of these new opportunities with ever-increasing sophistication. In fact industry analysts estimate the cost associated with telecommunications fraud to be over $4 billion a year and growing. This financial liability falls on the telephone carriers and their customers.

There are multiple points during the life of a call, that is the time between which it is dialed to the time it is paid for, that are susceptible to fraud. Without a system to detect fraud at a point early in the call life, it sometimes takes up to four months before the network carrier discovers that abuse has occurred. The number of ways to access network systems, the number of customers, and the vast array of billing choices merely serve to aggravate the situation. Thus, as telecommunications systems grow in complexity, the number of access points as well as the types of access create new opportunities for fraud.

Moreover, telecommunications network systems are not the only systems plagued with costly fraud. Credit card authorization houses, credit clearing houses, as well as virtually any paid data transmission network suffers from the abuses of those who would defraud the system. Therefore, driven by the dynamic nature of fraud, a flexible, data-driven architecture is needed.

The telecommunications industry has energetically tackled various aspects of fraud detecting, but while they may develop system(s) which detect certain instances of fraud [known now], but these cumbersome and costly solutions fail to maintain the needed flexibility for detecting not only fraud arising from actions that are known now to be fraud, but for the variations and mutations which arise in the future.

Moreover, such solutions are very network-specific in their implementation and are not able to analyze patterns of usage arising from disparate networks. For example, patterns of usage within an analog cellular network or a wireline network might not trigger concern by themselves, but when viewed together clearly indicate fraudulent activity, or at least cause for further investigation. Today, these patterns of usage must be considered separately from each system; there is no provision of one system which can address disparate networks and still provide a consolidated database for fraud analysis.

Additionally, current solutions have very rigid parameters within which the system will view event data. In light of the dynamic aspect of fraud a system and method which allows a user to key off of all data fields in an event detail record would be highly desirable.

SUMMARY OF THE INVENTION

In view of the above problems associated with the related art, it is an object of the present invention to provide a system and method for detection of network usage patterns which utilizes a real-time network monitoring capability to quickly identify suspicious usage patterns indicative of fraud.

It is another object of the present invention to provide a system and method for detection of network usage patterns which provides a highly configurable, data-driven capability to define usage patterns indicative of fraud.

It is a further object of the present invention to provide a system and method for network fraud monitoring which provides advanced alarm presentation and analysis tools for fraud investigation.

It is a further object of the present invention to provide a system and method for detecting network usage patterns indicative of fraud wherein such system and method support any combination of a plurality of disparate networks. Each of the networks are sources of respective network event records reflecting use of such network. Examples of such event records include call detail records from wireline, digital or analog cellular communications networks, or credit card usage and authorization records, roaming data (typically either real-time or via tape), video data, communications data, etc.

In the accomplishment of these and other objects, a computerized system and method for detecting fraudulent network usage patterns using real-time network monitoring of at least two disparate networks is shown which receives at least one event record from each of the disparate networks, analyzes each of the received event records to determine its type based on user-defined parameters, identifies predetermined fields in the analyzed event record to be used as keys, measures network usage associated with the key, summarizes usage statistics against at least one of the keys, compares statistic totals to predefined thresholds, and responds with an alarm or the like when the thresholds are met or exceeded.

The Fraud Management System (FMS) of the present invention effectively detects usage patterns indicative of many types of known fraud including: calling card related fraud, cellular phone fraud, subscription fraud, hacking, call selling, 900/800 fraud, and PBX or CPE fraud, among others. As a result, the FMS provides a means for detecting and ultimately preventing fraudulent use of communications or credit card/business networks. Monitoring network usage for fraudulent telecommunications network usage patterns according to the present invention takes place outside the switch and normally after the call event has completed.

The system monitors network usage on an event-by-event basis, accepting event record detail information from multiple network sources. As fraud is dynamic, exploiting new technologies and services nearly as quickly as they are deployed, the system also possesses a high degree of configurability. Fraud system administrators are able to create new detection mechanisms without the need to write new programs. Finally, the system and method of the present invention supports an analysis of trends in network usage, so that "early warnings" of new types of fraud are available.

The system and method of the present invention assists in detecting fraudulent use of a communications network by monitoring the network to detect usage patterns typically indicative of fraud. The present system is not limited to detecting the types of fraud known to exist today. It is a general-purpose system that can be configured to detect many different sorts of usage patterns. Thus, as new types of fraud arise, they can be detected without time-consuming and costly coding changes; instead the system's configuration data can be changed to respond to these new threats as they arise.

For example, as new customers are added to the network, the system accommodates them without disruption of service. The system is flexible enough to change as existing customers' network service requirements change, and can be tailored to their specific needs. As new networks services become available, the system can be readily updated to detect new types of fraud associated with those services. Moreover, as new sources of data become available for analysis, they can be easily integrated into the FMS without re-engineering existing system components.

The system architecture of the present invention is preferably built upon an object-oriented foundation. Each major system component is composed of a set of objects, which encapsulate both data and behavior. For the system administrator, this strategy provides reusable data structures which may be used as templates to simplify the configuration process. For the engineers who must maintain the system, this strategy minimizes the impact of coding changes, promotes the sharing of common code, and makes maintenance tasks much easier.

The fraud monitoring system and method of the present invention is quite useful to, for example, telecommunications carriers that are handling both wireless and wireline communications (including digital cellular and analog cellular network combinations). This is because all of the traffic of all of their subscribers is consolidated in one information repository. By way of illustration, when a carrier finds someone committing fraud, it will want to consider reviewing numbers they are calling. Moreover one wonders who is calling them. Before the present invention, one would have to check more than one repository for this information. The system and method of the present invention has all of the information regardless of network or type of transaction in one repository; such information can be quickly and easily obtained.

These and other features and advantages of the invention will be apparent to those skilled in the art from the following detailed description of the preferred embodiments, taken together with the accompanying drawings, in which:

BRIEF DESCRIPTION OF THE DRAWINGS

FIG. 3 is a schematic diagram illustrating in greater detail component relationships for a data collector and inbound interface shown in FIG. 2; and FIGS. 4a–c are examples illustrating types of screens for the fraud detection engine to employ while monitoring event records according to the present invention.

DETAILED DESCRIPTION OF PREFERRED EMBODIMENTS

The system and method of the present invention effectively detects network usage patterns often indicative of many types of known fraud, including: calling card-related fraud, cellular phone fraud, subscription fraud, hacking, call selling, 900/800 fraud, PBX or CPE fraud, credit card fraud, etc. While not all unusual patterns of network usage indicate fraud, certain patterns are more likely than not to indicate the possibility of fraud and bear further investigation by a user or fraud analyst. It should be understood at this point that any user referred to herein may also be a system administrator or a fraud analyst, or both.

Figure 1:
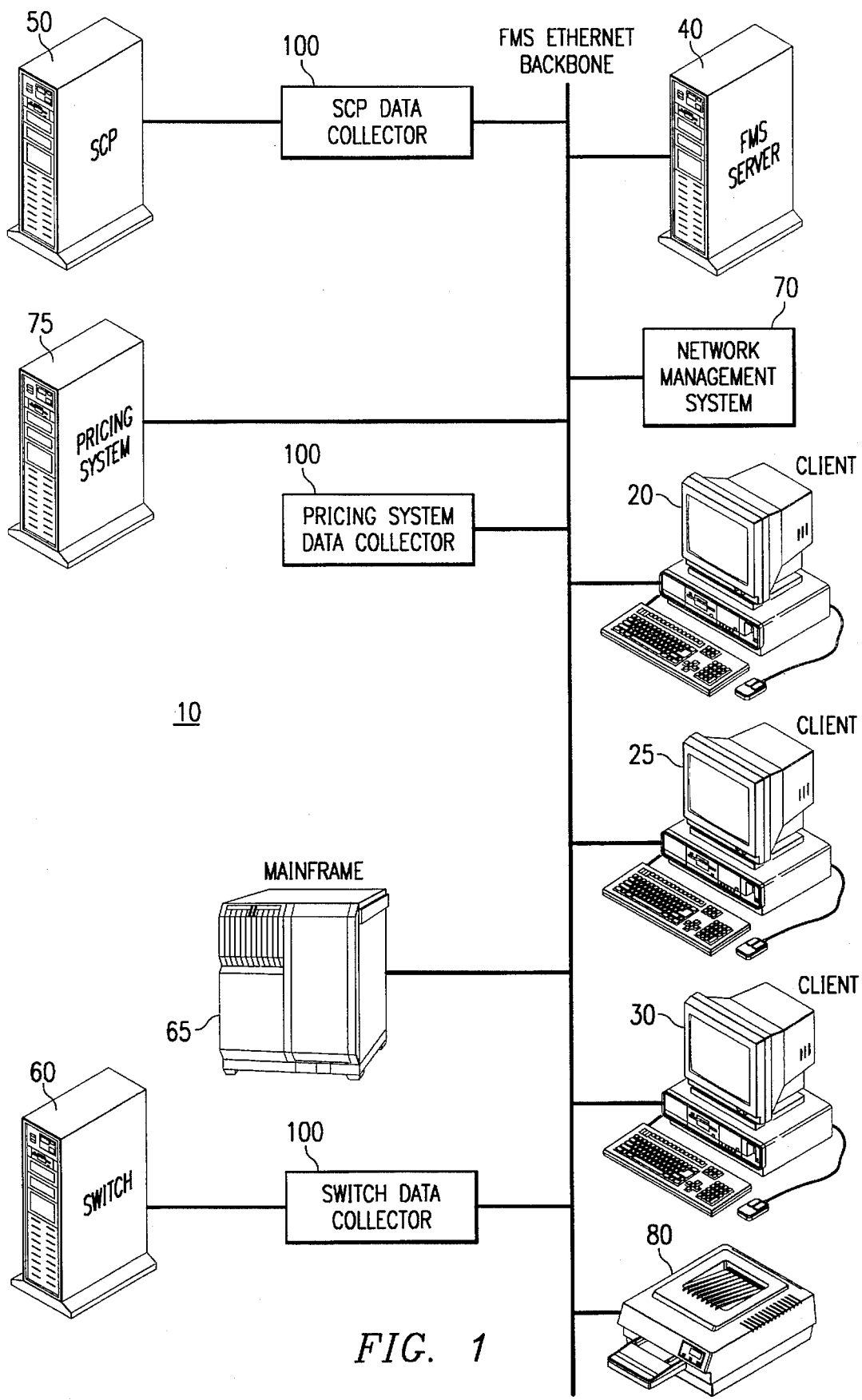
FIG. 1 is a schematic diagram illustrating the distributed hardware architecture of the fraud monitoring system according to the present invention.

According to a preferred embodiment of the present invention, FMS has a client-server architecture where a server will accept and respond to requests from multiple clients. Such architecture enables FMS to be easily distributed. FIG. 1 is a schematic diagram illustrating the distributed hardware architecture of the fraud monitoring system 10 according to the present invention.

Architecture 10 comprises FMS server 40 and one or more client workstations 20,25,30. FMS server 40 receives event records in batch or real-time from remote, local service control point(s) (SCPs) 50, switch(es) 60, pricing system(s) 75, and/or other computer(s) 65 via data collectors 100. Pricing System 75 provides priced event records such as priced call detail records to FMS server 40 for analysis. Switch(es) 60 may be any type of switch which reflects utilization of the network to which it is attached.

Depending upon the results of the analysis performed on the event records by the fraud detection engine (seen on FIG. 2) residing within FMS server 40 according to predefined conditions (explained later), FMS server 40 will send alarms to, and will respond to queries from, select users at client workstations 20,25,30. It should be understood that one or more workstations 20 may be employed to implement FMS 10. Client workstations 20,25,30 may be networked to FMS server 40 via a local area network (LAN) line or may be more remote. FMS 10 is preferably implemented with an Ethernet backbone.

FMS server 40 also interacts with Network Management System 70 and printer 80. Network Management System 70 is typically responsible for monitoring and controlling the elements and communication links which comprise a network.

FMS server 40 preferably is a computer employing an UNIX operating system. While various embodiments will occur to those skilled in the art, a preferred implementation of FMS server 40 of the present invention employs a Sun Microsystems SPARCenter 2000. Server 40 supports several processes (shown in FIG. 2) that execute concurrently to provide services to user applications. Examples of such processes include, but are not limited to, the Fraud Detection Engine, System Process Monitor, Access Control Server, and Logging Server.

According to a preferred embodiment of the present invention, the following layered products support the application processes on server 40: an X.25 gateway and Oracle7 (product and trademark of Oracle Corporation) products including Oracle7 RDBMS server, Oracle7 SQL*NET, Oracle7 tcp/ip driver, Oracle7 SQL*Plus and Oracle7 presentation tools. The Oracle7 RDBMS is preferably used in the present invention as the primary database package to store and maintain Profile data, Geographic Distribution data, Roles and Access Rules, and Logs.

Oracle7 provides the system administrator and user with a set of tools to manage database objects such as tables, stored procedures, and triggers. SQL*FORMS, SQL*PLUS and SQL*Report provide tools for a user to analyze logs. These are SQL-based tools which are used to define standard reports whose formats are stored in the database and to create ad hoc reports via query-by-example capability. Procedural Language/SQL (PL/SQL), stored procedures, and triggers allow users to enforce complex business rules at the server level thereby improving application reliability.

User access to FMS system 10 is via the User Applications and Administrative Facilities of the present invention which reside on UNIX client workstations 20,25,30 networked to FMS host 40 according to a preferred embodiment of the present invention. Some examples of user applications 160 (seen in FIG. 2) include user logon 164, alarm presentation 170, and database access 168. Additionally, each workstation 20,25,30 preferably has access to Oracle7 software.

FMS 10 of the present invention is preferably an object oriented software system implemented using SNAP and C++ programming language. Strategic Network Application Platform (SNAP) is a workstation development environment developed by Template Software, Inc. of Herndon, Va. Like the hardware, the application architecture is highly distributed.

Figure 2:
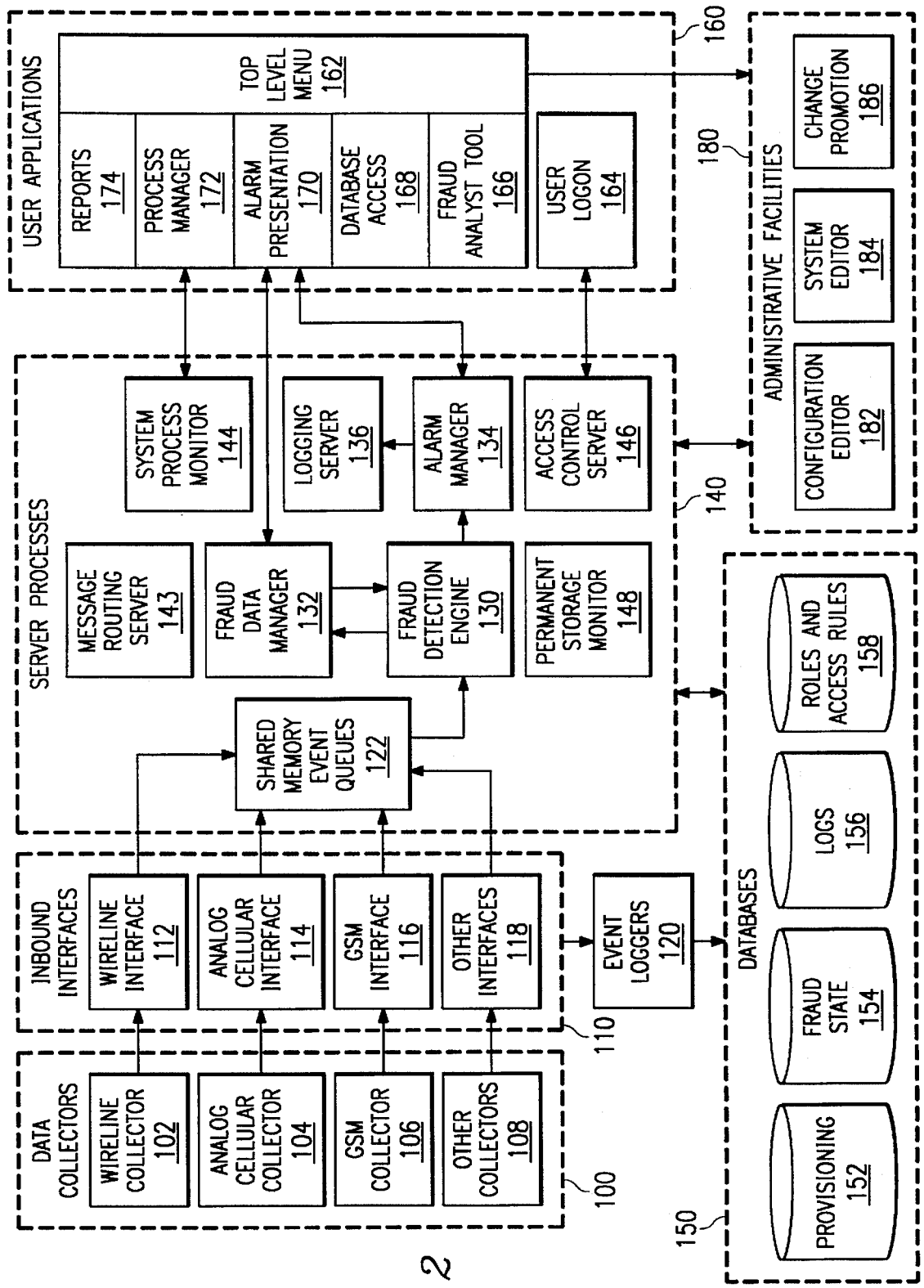
FIG. 2 is a schematic diagram depicting the fraud monitoring system application architecture according to the present invention.

Consider now FIG. 2 which is a schematic diagram depicting the fraud management system application architecture 10 according to a preferred embodiment of the present invention. Boxes represent functional groupings and may or may not represent distinct physical processes. For ease of understanding, only the principal interprocess communication links have been illustrated. Each process is more fully described below.

The FMS 10 application architecture comprises: inbound interfaces 110, server processes 140, user applications 160, and administrative facilities 180.

Inbound Interfaces 110 are responsible for communicating directly with systems outside FMS 10. They receive raw event records via data collectors 100 and format them for analysis as well as wrapping any necessary communication protocols around outbound transactions to other systems.

Server processes 140 include fraud application services and support system 10 as a whole. They provide event record analysis, alarm generation, alarm routing, security control, logging control, and application infrastructure on behalf of all users. FMS 10 may be "scaled up" by running multiple copies of Fraud Detection Engine 130.

User applications 160 provide a layer of visibility into the fraud application services. User applications 160 include user logon 164, alarm presentation 170, user commands (not specifically shown), fraud analyst tool 166, process manager 172, and database access 168. User applications 160 are distinguished by the fact that each user of the system has their own copy. Though user applications 160 may share a processor with server processes 140, they will typically run on remote intelligent workstations.

Administrative facilities 180 are a special type of user application. They provide a set of tools to configure and provision FMS 10. Administrative facilities 180 are not meant to be universally available and are typically restricted to users associated to system administrator roles.

An event record is a collection of data fields which describes an instance of network usage. Each event record contains all of the information about a call event that the system uses. FMS 10 preferably assigns each call event record an event type or category, based on the types of network services the record reflects. FMS 10 considers call events to be atomic (i.e., call events cannot span records). The following are some examples of event types: IDD calls, calling card calls, automatic collect calls, information services, other services, digital cellular calls, digital cellular forwarded calls, analog cellular calls, roaming calls. Other examples include event types resulting from the use of a video network, use of a data network or other use of a voice network.

In addition to the above-mentioned application components, FMS 10 uses a number of logical databases 150. Briefly, they include:

Provisioning database 152 holds the relatively static reference data needed by the server processes 140 and user applications 160. This includes profile, and sub-profile definitions, log definitions, and alarm presentation defaults.

Fraud state database 154 is used by Fraud Detection Engine 130 to provide a view of its state. It contains the current relationships between keys, profiles, and sub-profiles as well as current analysis statistics.

Logs database 156 contains the logs of alarms, network utilization records (event records), and user activity. This database is a consolidated database including up to all incoming network usage information received via inbound interfaces 110 from all networks connected to FMS 10, whether such records reflect video usage, data usage or voice usage of their respective networks. Less than all such information from each network will be stored in logs database 156 should a customer so wish; those kinds of records which are to be stored in the database are selected based on the customer's predetermined criteria.

Roles and access rules database 158 controls privileges and access rights granted to users of the fraud system.

Consider briefly FIG. 3, which is a schematic diagram illustrating in greater detail relationships for data collectors 100 and inbound interfaces 10 shown in FIG. 2. The interface modules link FMS 10 to the external systems within the network, i.e., service control point(s) 50, pricing system(s) 75, switch(es) 60 and/or other computers 65. Interface modules come in three basic types: event interface modules 100,110, command interface modules (not shown), and simulators 180. The first deals exclusively with data incoming for fraud analysis, the second principally with outgoing transactions, and the third with both.

The event interface modules consist of three reusable components: data collector 100, identifier and extractor 115, and event instantiator 117. Data collector 100 provides connections to the external systems: SCPs 50, pricing system(s) 75, switch(es) 60, and/or other external computer (s) 65. It also supports other types of communications links, e.g. asynchronous, to communicate to printer 80 ports. Data collector 100 provides real-time access to network external systems 58,60,65,75.

The support for SCP 50 connection is preferably provided through an X.25 gateway product from SunSoft, a subsidiary of Sun Microsystems. The gateway supports an application programming interface which is used to deliver call event data to customized event identification and data extraction modules. The pricing system 75 interface consists of a customized application which processes files of priced call event records. These files are received from pricing system 75 using an intermediate file transfer mechanism such as the UNIX File Transfer Protocol (FTP).

The Network Management System 70 interface is not a process, but a module included in all other processes running on the FMS server platform 40. Whenever a process must send an alert through the interface, it invokes this module. The module formats the alarm and sends it to Network Management System 70. Another preferred embodiment of the interface allows other processes to invoke a separate interface module via procedure calls. As before, the module formats the alarm and sends it to Network Management System 70.

Identifier and Extractor 115 identifies each type of call event and extracts the pertinent information from the input record. The identifier portion determines the event type based on the record format and the event source, while the extractor portion uses the event type to specify which fields should be pulled from the input record. Event instantiator 117 uses the extracted fields to create a normalized call event. Once created, the normalized event is passed to FDE 130.

The source of a call event is the system that issued the call event, e.g., SCP 50 or pricing system 75. The call event type is defined by the record format of the received event, and the extracted fields are portions of the event record that have been selected for use in analysis. FDE 130 extracts the time stamp from the call event and uses the event time in its calculations, for which a time stamp is needed.

Command interface modules operate much like event interface modules except in reverse. They receive transactions destined for other systems and wrap them in envelopes of application and communication protocols. Transaction complexity can range from a simple ASCII string as presented to a printer port to an ASN.1 message enclosed in an X.25 packet.

Simulator 180 is used to test the system configuration before it is released into production. Before any new profile or algorithm is released, Simulator 180 can be used to test the accuracy of new changes to the system. Simulator 180 may also be used to test the system in the absence of live records from SCPs 50 or pricing system 75. Simulator 180 can use manually entered call events or call events recorded by the system in production.

Returning now to FIG. 2, as noted above, the fraud monitoring system of the present invention supports interfaces to a variety of sources of call detail data: standard wireline, wireline information services, analog cellular, digital cellular, analog roaming cellular, etc. Separate inbound interfaces 110 are preferably developed for each source for increased speed of input. Each interface, in turn, has three components: data collector 100, inbound interface 110 and event logger 122. The general capabilities among data collectors 100, among inbound interfaces 110, and among event loggers 122 are identical. They differ only in the event record formats they handle and in the communication protocols used with their respective network elements.

Specifically, data collector 100 is a computer directly connected to the call detail data source or network. It reads incoming raw call detail records (CDRs), filters out CDRs irrelevant to fraud detection, reformats relevant CDRs into standardized FMS internal formats, passes UNIX files of standardized CDRs to its respective inbound interface 110, logs throughput statistics to UNIX flat files and permits manual reconfiguration through a graphical interface so one data collector can provide backup for another when necessary.

Inbound interface 110 receives the files sent by data collector 100 and writes their records into shared memory queues 122 for subsequent retrieval by the Fraud Detection Engine 130. Preferably the number of different queues, the size of each queue, and the priority of each queue are each configurable. Moreover, it is preferred that shared-memory queues 122 support variable event formats. It should be understood that while data collectors 100 and inbound interfaces 110 are processing the incoming raw detail records to put them in a format for FDE 130 to analyze, the formats being presented to FDE 130 are preferably not identical. In fact, depending on the data source, the record layout provided to FDE 130 will vary. For example, the digital cellular, analog cellular, information services [800 and 900 lines] and other services [landline, international, etc.] record layouts (format) are preferably different due to the kind of detail provided in a corresponding CDR and the specific information within such CDR requiring monitoring.

Inbound interfaces 110 check for the presence of processable event files in a configurable directory at a configurable time interval, and process files from data collectors 100 in an oldest to newest sequence based on file creation date. Interfaces 110 assign each CDR a unique id, an event type and subtype, write CDRs to a shared-memory queue 122 where they can be read by FDE 130, and write a copy of each record and file throughput statistics to logs database 156 (FIG. 2) via event logger 120.

The assignment of subtypes is preferred because analysis of the record fields will be different based on certain groupings. For example, an event type may be a cellular call. CDRs falling within this example event type may include the following subtypes: a) a call originating with a mobile unit to a landline number, b) a call originating from a landline number and terminating at a mobile unit, and c) a call between mobile units. Thus, when a CDR is received, it will be event typed as cellular, and then subtyped to enable appropriate analysis by Fraud Detection Engine (FDE) 130. If, continuing with the present example, the profile required that FDE 130 monitor the cellular numbers involved in the CDR, FDE 130 would need the originator information if the CDR is subtyped "a" above, the recipient information if the CDR is subtyped "b" above, and the originator and recipient information if the CDR is subtyped "c" above.

Event logger 120 receives files sent by inbound interface 110 and checks for the presence of processable event files each containing CDRs from inbound interface 110 in a configurable directory at a configurable time interval, and processes the files in an oldest to newest sequence, based on the file creation date. Logger 120 inserts each CDR processed by the present invention into Logs database 156 and writes a log of which database tables it updates on each day.

Server processes 140 fall into two categories: those which directly support the business of detecting and controlling network fraud and those which control or report on the state of the entire application. FDE 130, fraud data manager 132, and alarm manager 134 fall into the first category, while the remaining processes are in the second.

Fraud Detection Engine (FDE) 130 analyses normalized call events received from inbound interfaces 110 via shared memory event queues 122 and takes action when it detects suspicious patterns of usage. Based on the current system configuration, the data in each event is used to derive a series of measurements. Each measurement is accumulated over a number of time intervals into buckets. When the value of a bucket crosses any of the thresholds defined for it, the engine responds. The response taken may be the generation of an alarm message or the logging of detailed event information. Responses from several measurements can also be combined together so that the system can detect fraud based on the combination of related measurements.

Measurements made by FDE 130 can depend on the data received in a call event, so that the engine's behavior can be customized in unique ways. For example, calls to certain destinations, such as Colombia, might be considered suspicious under normal circumstances. However, if a particular corporate customer has a branch office in Colombia, calls to that region would not be considered suspicious for that customer. This type of customization is achieved via the use of profiles and subprofiles (discussed at length later). FDE 130 is also capable of performing collision measurements on roaming data, and determining geographical impossibilities for mobile and roaming calls.

The following is a pseudocode description of the processing according to the present invention which a fraud detection engine performs on each event it receives:

```
Determine event type and subtype
Determine key fields from event type definition
For each key field in the event
    Look up key, buckets, and history in the database
    If key does not exist
        If key is not dynamic
            Go on to the next key field in the event
        else
            Determine profile for the new key using the
            default profile policy
            If profile can be determined
                Create new key, buckets, and history
                according to default profile
            else
                Go on to the next key filed in the event
            end if
        end if
    end if
    For each subprofile in the key's profile
        Obtain the measurement value
        For each bucket affected by the measurement
            If the bucket time interval has expired
                reset the bucket
            end if
            Update the bucket using the measurement value
            If the new bucket value causes a threshold to
            be reached
                Create responses defined for this bucket
            end if
        end for each
    end for each
```

FDE 130 supports variable event formats, although it can also support a single "normalized" call event format. It also supports key types which include (but are not limited to) ESN, pay phone number, test number, cellular number. Moreover FDE 130 supports a "fraud score". "Fraud score" is a response type which adds a configurable number of "penalty points" to fraud score accumulators. Support for a fraud score specification is found on the profile. When the total number of penalty points for a key reaches a configurable total within a configurable time interval the FDE 130 will send an alarm to alarm manager 134.

According to a preferred embodiment of the present invention, FDE 130 adds two time stamps to the alarm creation request so that the events which contributed to the alarm may be retrieved from the call vent database. The time stamps correspond to the "begin time" of the associated bucket and the event time of the event which triggered the request. FDE 130 includes the event type in the alarm creation request. As an alternate embodiment, FDE 130 may also pass event data to alarm manager 134 along with the alarm data.

Fraud data manager 132 manages the real-time cache of current keys, buckets, profile names, measurements and responses currently being monitored by FDE 130. It dynamically creates new database entries, and purges entries no longer needed. It makes sure that when multiple engines 130 are running that bucket updates are serialized and the integrity of shared database caches is maintained.

Fraud data manager 132 and FDEs 130 use the same underlying mechanism to access fraud state database 154.

The Fraud Data Access Services (FDAS; located within server processes 140 but not specifically shown) consists of data structures and library routines which perform operations on this database. FDAS allows disk-resident and cached data to be presented to the applications as one logical database. The FDAS permits the size of any shared database cache to be dynamically increased. Moreover, unused key slots may be dynamically released without destroying other data. The FDAS captures the cell site code and start time of the most recent call.

Alarm manager 134 receives all alarms generated by FDE 130. Each alarm preferably has a number of attributes, including the alarm text, time stamp, severity, and status. It maintains the master copy of all current outstanding alarms, and tracks changes to the state of each alarm. It selectively dispatches a copy of each alarm to all users who have subscribed for them (based on alarm presentation 170 user's subscription criteria) and processes all alarm handling commands that the users may issue. User subscription criteria include alarm group, key type, and ranges of key values.

Alarm manager 134 receives subscription requests via remote procedure calls from alarm presentation 170. Alarm manager 134 also requests and receives a list of candidate cases for the alarm key type and value via remote procedure calls to/from the Case Management Server (located within server processes 140 but not specifically shown).

Alarm manager 134 accepts a closure status from alarm presentation 170 when an alarm is cleared. The status indicates whether the alarm was true or false. Alarm manager 134 also accepts new time stamps in the create alarm request from FDE 130 so the events which contributed to the alarm may be retrieved from the call event database within logs database 156. The time stamps correspond to the "begin time" of the associated bucket, and the event time of the event which triggered the alarm.

The state of an alarm can be either unassigned, assigned, or cleared. In addition, users have the ability to reassign an alarm assigned to themselves to another user, or to modify the severity of an alarm. Each time the state of an alarm changes, alarm manager 134 requests that an entry be made in the alarm log.

Alarm manager 134 applies an escalation policy to alarms that are not acknowledged within a configuration time-out period. As time-out occurs, the severity level of the alarm is raised in an effort to get a subscriber's attention. As a last resort, a warning message will be sent to Network Management System 70, to the effect that there has been no acknowledgment of suspected fraudulent usage.

Alarm manager 134 distributes a particular alarm to all users who have subscribed for it. If an alarm for which no user has subscribed cannot be delivered within a configurable time period, then alarm manager 134 will send a special alert to Network Management System 70.

Logging server 136 provides a single point for control of all logging in FMS 10. Any process in FMS 10 that needs to log information, connects to logging server 136 and passes it the records it wishes logged.

Logging server 136 receives data from other application processes, determines where the data should be logged (if at all), and commits the data to permanent storage. For example it receives requests to log selected call event records from FDE 130. Logging server 136 processes requests asynchronously to minimize database related performance bottlenecks. While FIG. 2 only depicts alarm manager 134 in communication with logging server 136 for ease of understanding of certain processes described herein, it should be understood that any process requiring logging services may communicate with logging server 136.

Access control server 146 governs user access to FMS 10. It also manages roles & access rules database 158. When another process must validate a request for data or services, it will query access control server 146. When a user logs on to FMS 10, access control server 146 validates the user and determines their role. No access to FMS services are granted unless access control server 146 first validates the user. It then supplies information to top level menu 162 enabling only those facilities to which that user's role has access. Server 146 also assures that a particular User ID is associated with only one connection to FMS 10 at a time. It will also supply information to alarm manager 134 about the role's authority to receive certain alarms. The information may then be used by alarm manager 134 to route alarms to FMS operators.

Access control server 146 validates the IP addresses of its client processes by first loading a list of valid IP addresses during initialization. During user logon, the IP address of the client workstation is validated against the list for the user's role. If an IP address is not assigned to the role, then the role has access to all IP addresses. The logon will be rejected if the IP address of the client is not in the list. Updates to the list are accepted from the security editor. If the IP address associated with an active session is deleted from the list, the session is terminated immediately. Access control server 146 receives instructions to add, update and delete IP addresses, including those IP addresses associated with a role, via remote procedure calls from system editor 184.

System process monitor 144 starts, stops and monitors the health of each FMS 10 process. This process allows the system administrator to start and stop other FMS processes. It receives status information from FMS processes on their health. If a process has changed its state, system process monitor 144 sends a signal notifying process manager 172, event logger 120, and others of the change as well as sending an alarm to Network Management System 70.

At a request from other FMS 10 processes, message routing server 143 constructs runtime messages using standard message templates and substitutable text and then delivers those messages to one or more destinations. More specifically, it loads a set of message templates and destination definitions from provisioning database 152 during program initialization, accepts requests from other FMS processes to construct messages, delivers the messages to one or more destinations based on configuration data received from provisioning database 152, provides support for message delivery to system console, user-defined log files and UNIX mail destinations, provides file management for all user-defined log files including retention and rollover periods, sends all messages to system console which cannot be delivered correctly according to their specification, accepts dynamic add/update/delete requests for destination definitions from system editor 184, and enables/disables messages.

The next series of processes involve user applications 160.

User logon 164 is preferably the only means by which a user may gain access to the services provided by the rest of FMS 10. It collects a special user id and password from the user and passes it to access control server 146 for validation. User logon 164 receives from roles & access rules database 158 a list of services provided on top level menu 162 for which the user is authorized. Among other options, top level menu 162 permits a cut-through window to be opened to view customer billing data on another computer, and permits fraud analyst tool 166 to be invoked.

User commands represents a collection of miscellaneous menu and sub-menu items which are actually part of top level menu 162. Whether or not particular items are available to an operator is determined during the user logon process. Example commands include commands to mark and unmark keys for logging, to control whether or not fraud alarms are sent to Network Management System 70, to access database access 168, to query profile and template data, and to initiate background reporting tasks.

Alarm presentation 170 provides visibility into the list of outstanding alarms raised by FDE 130 and stored in alarm manager 134. Alarm presentation 170 contains several major displays used by operators and investigators to manage the alarms generated by the present invention. Users can perform a number of operations upon the current alarms from within alarm presentation 170. They can accept an alarm, indicating that they are assuming responsibility for it and they can clear an alarm they have previously accepted. Other operations include the reassignment of an accepted alarm to another user, and, for suitably privileged users, the ability to escalate or de-escalate the severity of an alarm.

Alarm presentation 170 uses the concepts of role and subscription. Each user is assigned to a role, which defines his access privileges on the system, as well as his job in the organization. Rules associated to the role determine which alarms a user is entitled to see. A user may subscribe to alarm manager 134 for any subset of his entitlement. Alarm presentation 170 interacts with the access control server 146 to request and receive the user's alarm subscription limitations. Alarm presentation 170 also transmits to alarm manager 134, via remote procedure calls, information for alarm manager 134 to process the alarm subscription criteria.

Alarm presentation 170 supports the ability to select multiple alarms and issue a command against the selected group. Upon request, alarm presentation 170 displays the call events associated with a selected alarm. It also permits the user to assign a status of either "true" or "false" to an alarm when it is cleared. This status will be retained in the database and be available for subsequent reporting. Alarm presentation 170 displays new alarm attributes such as Case ID and indicator of candidate cases. Alarm presentation 170 invokes case management server to: select a case from a pick list, select a case from a list of candidate cases, request alarm and CDR assignments to a selected case, add case comments and assign an alarm to a case.

Alarm presentation 170 calls up an alarm subscription tool when alarm presentation 170 is initially invoked. This alarm subscription includes Alarm Groups, Key Types, and Ranges of Key Values. In addition, the user can change the alarm subscription at anytime, thus destroying all displayed alarms and redisplaying alarms matching new subscription criteria.

Alarms can be displayed in both summary and detail formats. For example, a raw alarm display contains a listing of all the alarms currently maintained by the system which the user is authorized to view. This information may be viewed using either a graphical or a textual form. The textual form shows a summary line for each current alarm which the user is privileged to see. Alarm summary lines may be color-coded according to severity or may provide other graphical indication of severity. The graphical form is a line chart which shows the number of outstanding alarms over time. The advantage of the graphical format is that it allows the operator to get an overall picture of system activity at a glance, without being overwhelmed by details.

A filtered alarm display allows the user a great deal of control over the way in which alarm information is presented. Alarms may be sorted in several ways, such as by time, by severity, or by owner. The operator can specify filtering criteria which restrict the number and type of alarms shown on the display.

Database access 168 provides, on an ad hoc basis, both SQL and non-SQL interfaces to the data logged by the various FMS processes. Database access 168 facilities are invoked through menu options on top level menu 162. In a preferred embodiment of the present invention, for SQL-based queries, a simple command line interface is provided, for example, via Oracle's SQL*Plus, while for non-SQL queries, or query-by example, is supported with Oracle's Data Query product.

Fraud analyst tool 166 contains facilities for investigating, defining, and managing cases of fraud and abuse. It is built on and augments database access 168 for ad hoc queries and provides a means of extracting network usage data from log database 156 for use in other applications. Fraud analyst tool 166 creates cases, retrieves records of network utilization from log database 156 based on user-specified search criteria, assigns events to cases based on user-specified search criteria, adds comments to a case, and provides an audit trail of case activity. It can also reassign a case, close a case, or invoke a case selection tool to: select a case from a pick list of existing cases or select a case from a list of candidate cases. Fraud analyst tool 166 interacts with case management server via remote procedure calls, to process updates to a case. It should be understood that a user invoking this tool will probably be considered a fraud analyst.

The case management server coordinates access to case management information, facilitating multi-user features of a case management editor. It primarily assures that case management data integrity is always preserved. Upon requests from clients, it creates a case, assigns alarms and CDRs to a case, adds comments and creates audit history, declares certain key types and values as relevant, reassigns and closes cases, and nominates candidate cases for new alarms. The case management server coordinates the adding/updating of cases with alarm presentation 170 sessions and fraud analyst tool 166 sessions. It also evaluates open cases as candidates for new alarms received from alarm manager 134.

Process manager 172 provides visibility into system process monitor 144 by presenting a topology map representing the health of all FMS 10 processes on a system administrator's workstation. Icons in the map represent individual processes. The icons preferably change both their shape and color depending on their status (e.g., initializing, running, terminating). Properly authorized users may access process manager 172 to individually start, transition or terminate any application process or user connection.

Administrative facilities 180 are a collection of editors including configuration editor 182, system editor 184, and change promotion 186, among others (not specifically shown), used to control system configuration. The editors provide an easy way to manipulate the configuration data used by the servers that control the operation of FMS 10. There are editors for alarm management and presentation, profiles and subprofiles, configuration management, access control, logging control, customer provisioning, etc. for FMS application runtime parameters. All editors are accessed through a common top level editor 162 window. Editors within this facility are available only to suitably privileged users, such as fraud system administrators.

Administrative facilities 180 also provide the application's release management functions. With the important exception of objects comprising profiles and subprofiles, most configuration modifications are released directly into the running application programs. Profile and subprofile structures, however, determine how call events are analyzed and what patterns may indicate fraudulent network usage. These structures are therefore subjected to change management procedures, are staged, and released into the running application programs in a way which permits a rollback to occur if the release of any component fails. When provisioning database 152 has been successfully updated, fraud data manager instructs FDE(s) 130 to refresh their memory resident object models with the new data.

Most changes to a profile structure invalidate the statistics which have been collected under its control. According to a preferred embodiment of the present invention, only changes to threshold values and responses can be implemented without affecting how current bucket totals are interpreted. All other changes to a profile will cause its associated buckets to be re-initialized the first time they are referenced following the change.

One of the editors within configuration editor 182 relevant to the fraud monitoring capability of the present invention is the profile editor (not specifically shown). This editor is used to create new profiles and templates for key types. Information gathered by this editor includes threshold values, bucket types, response types, as well as screening lists. Included in the profile editor is a provisioning facility which, in the absence of an automatic interface, may be used to manually associate particular key values with profiles and sub-profiles.

Configuration editor 182 provides the facilities for constructing all run time reference data which is subject to change management procedures. This includes profile structures and manually provisioned key data.

Configuration editor 182 contains a measurement editor (which in turn processes the following additional measurement types: geographic velocity check and collision), a cellular location editor, and an alarm group editor. The "copy/add" function is supported by all editors. This function creates new objects whose attributes are copied from another object.

A response editor (not specifically shown) within configuration editor 182 supports the "fraud score" response. This response causes a configurable number of "points" to be added to the fraud score buckets. These buckets behave like any other such that they have time intervals, thresholds and responses. A profile editor, also within configuration editor 182, supports the fraud score utilization. The provisioning editor of configuration editor 182 supports the various key types (key type examples provided below). Configuration editor 182 gains access to change packages through a configuration server process (located within server processes 140 but not specifically shown).

Configuration editor 182 interacts with the configuration server for access to change packages and for notifications of production data updates. Editor 182 offers the user a means to refresh their view of production data. Preferably this must be done when the configuration server notifies configuration editor 182 that a change package has been successfully released. The editor interacts with the configuration server for access to change packages and for notifications of production data updates.

System editor 184 provides the facilities for constructing all run time reference data which is not subject to change management procedures. This includes security rules, storage object definitions and other operational parameters. Although system editor 184 does not employ the change package concept, audit trails of all configuration changes are created and held for reporting.

The access rules editor within system editor 184 supports IP addresses. A security editor defines workstation IP addresses which will be permitted access to FMS 10. Editor 184 interacts with access control server 146 to validate and add/update/delete IP addresses.

The configuration server coordinates access to change package information, facilitating multi-user features of configuration editor 182 and change promotion 186 processes. The configuration server primarily assures that configuration data integrity is always preserved, especially during dynamic reconfiguration. It controls the check-out and check-in of change packages such that a change package may be checked out by only one user at a time. The server serializes the release of change packages into the production environment so that only one package may be promoted at a time. It notifies active configuration editor 182 and change promotion 186 sessions when a package has been successfully released so that they may refresh their views of production data. The configuration server interacts with configuration editor 182 sessions to coordinate the check-out and check-in of change packages and notifies such sessions when production configuration data has been modified. It permits release of change packages from multiple change promotion 186 sessions and notifies them when production configuration data has been modified.

Change promotion 186 migrates entire change packages from staging status to the production environment. It re-validates all changes in a package against the current production configuration, updates the production database, and creates history records of the modified data. Change promotion 186 accesses change packages through, and requests permission to promote a package from, the configuration server. It refreshes the user's view of production data when the configuration server notifies change promotion 186 that a package has been successfully released by another user. Moreover, it interacts with the configuration server for access to change packages, permission to promote, and for notification of production data updates.

The present invention initiates alarms based on network usage patterns defined by a user as indicating potential fraud or at least meriting additional investigation. The user or fraud analyst defines the network usage patterns of interest by preparing subprofiles and profiles. FMS 10 via FDE 130 uses these subprofiles and profiles to analyze all event records. It should be understood that while the following description is in the communications arena, event records may for example be credit card transactions including purchases and authorizations from an authorization house, clearing house or credit network.

A subprofile is a complete specification of one analysis to determine a particular network usage pattern. It typically includes a name, an optional description, the criteria for recognizing call events relevant to the analysis, a specification for computing a statistic from each qualified call event, the time periods over which these statistics must be accumulated, the threshold levels considered suspicious, and instructions on what the system of the present invention should do should those levels be reached. A simple subprofile might be expressed in English as:

For any or all mobile numbers, issue a medium severity alarm when a count of at least 5 mobile calls made between midnight and 6:00 a.m. to either Guatemala or Columbia occur within a one hour window; issue a critical severity alarm if at least 10 such calls occur.

Architecturally, the system of the present invention can support any number of subprofiles.

A subprofile also specifies responses FMS 10 should make when it detects the network usage pattern of interest (when the stated thresholds have been met or exceeded). Again, there are a variety of responses, but the two preferred responses are:

Alarm—The system will create an alarm message to be sent to authorized users notifying them that a certain type of network usage has occurred. This is the most common type of response. If selected, it must include a severity specification and a short alarm message.

Fraud Score—The system will add a specified number of points to a special accumulator associated with the phone number or calling card under analysis. Because only one of these is permitted per key, the rules for interpreting this accumulator are set up at the profile level. The fraud score permits the system to raise an alarm when a combination of network usages, not suspicious by themselves, occurs over some specified time interval. If this type is selected, the number of points to be added to the score must be specified.

Because each subprofile collects together one call event type, one measurement, a list of event screening criteria, and thresholds with associated responses, if even a single component must change, a separate subprofile should be defined. Using the subprofile example above, if it were desired to perform identical analyses on roaming calls as well as mobile calls, two subprofiles would be required (in this example, roaming calls and mobile calls are separate call event types).

A subprofile specifies the call event type to which it will be sensitive. Repeated executions of a subprofile normally result in a statistic being accumulated over time. To prevent heterogeneous types of data being accumulated together, making the total difficult to interpret, a subprofile is preferably used with only one call event type.

A subprofile specifies the type of measurement to be made on each event of the type with which it is associated. A measurement is an operation performed on a call event which yields a numeric result. A subprofile also may state further data conditions which the event must meet before the measurement may be carried out. These are known as screenings, which are further described below. There are a number of measurement types from which to choose, although others will occur to those skilled in the art:

Simple Count—If a call event meets the additional data criteria specified in this section (if any), then the result of this measurement is 1; otherwise the result is 0.

Sum—If a call event meets the additional data criteria specified in this section (if any), then the result of this measurement is the value of some specified field extracted from the event. If this measurement type is selected, the name of some field from the event type must be specified. The field must be numeric and be usable in arithmetic expressions.

Call Collision Count—If a call event meets the additional data criteria specified in this section (if any), and the call is detected to have been in progress at the same time as another call for the same number or calling card then the result of this measurement is 1; otherwise the result is 0. If this type is selected, then one of the call collision subtypes must be chosen.

Geographic Velocity Count—If a call event meets the additional data criteria specified in this section (if any), and the system determines that it was impossible to move from the location of a previous call to the location of the current call within the time between calls, then the result of this measurement is 1; otherwise the result is 0. This measurement type is valid only for wireless call events.

Frequently the specification of a call event type does not narrow the scope of analysis enough for meaningful conclusions. Additional data criteria, or screenings, are required to produce meaningful statistics. A screening is a test applied to one field in a call event. If the test is true, the screening is passed. For a measurement to produce a non-zero result all screenings attached to the measurement must be passed. FMS 10 supports a variety of types of screenings, including:

List—The screening check performs a comparison against a list of discrete values using the contents of a field in the event. If the contents match one of the elements in the list the event passes the screening check. An illustrative example which looks for calls originating from Guatemala or Nicaragua might look like that seen in FIG. 4a.

Range—The screening check performs a comparison against a range of values, defined by an upper and lower limit, using the contents of a field in the event. If the contents fall within the specified range, the event passes the screening check. An illustrative example which looks for calls made after business hours might look like that seen in FIG. 4b.

Pattern—The screening check performs a comparison against a value that contains "wild card" characters. Only non-wild card characters are required to match the event field being compared. Patterns may be specified only for the left-most characters in a string. An illustrative example which looks for calls made to the Caribbean might look like that seen in FIG. 4c.

Any number of screenings may be specified for the measurement.

A subprofile may contain more than one time interval (with thresholds and responses) over which measurement results will be accumulated. The time intervals may be specified as a number of days and/or hours and/or minutes. The maximum time interval is architecturally unlimited.

The time interval should have at least one threshold. A threshold is a numeric value appropriate to the type of measurement being accumulated. For example the threshold values for a measurement summing Event Durations will likely have a different range of values than those for a measurement counting calls to Iceland.

For each threshold, zero or more responses (see above) may be specified, but they will be made only when an accumulation reaches the threshold within the associated time interval. A threshold's responses can be triggered only once per time interval, that is, at the moment when the accumulator reaches or exceeds the threshold value. When the time interval expires, the time interval and its accumulator start over and the responses are eligible to be executed once again.

As a further illustration of the above concepts, consider the following subprofile:

Call analyst's beeper when a count of 25 completed calls from a mobile number of less than 5 seconds' duration occur within a 40-minute window.

"Call analyst's beeper" is the FMS 10 response desired to a measurement of a "count" equalling or exceeding the designated threshold of "25" events. The events in the example subprofile are "completed calls" keyed off a "mobile number". The counting system is incremented if an event passes the screen of "5 seconds' duration" within the user-specified time interval of forty minutes.

A profile is a collection of preferably from one to ten subprofiles. It should be understood, however, that there is no architectural limit to the number of subprofiles that may be assigned to a profile. A profile typically includes a name, an optional description, the associated subprofiles, an alarm group specification used to categorize all alarms issued from the profile, and a fraud score specification which identifies the time period over which the profile's fraud score must be accumulated, the threshold level considered suspicious, and instructions on what the system should do should that level be reached. A subprofile may be used in any number of profiles.

A user may define a code which will be assigned to all alarms issued from subprofiles while they are serving as a member of a particular profile. This code can be used as a criterion for routing alarms to selected users either on the basis of their wishes or their level of authorization. A profile may have only one alarm group code at a time, but an alarm group code may be used in any number of profiles.

By defining a profile, a user may also configure the time interval, threshold value, and alarm response for the profile's fraud score accumulator. The specification rules are nearly the same as for time intervals, thresholds, and responses in the subprofile definition. If no specification is provided then the system will preferably ignore any fraud score response made by a subprofile in the profile.

Profiles are preferably associated to keys. A key is any field occurring in a call event record whose value identifies an individual user of network services. Examples include mobile subscriber numbers, wireline subscriber numbers, and calling card numbers. Although a profile may be associated with any number of keys, a key preferably may have only one profile at a time. A key's profile is a complete specification of the analyses to be performed any time that key is found in any call event record.

Examples of key types include, but are not limited to: public pay phone number, non-pay phone calling number, called number, test number, calling card number, digital number, analog ESN, customer ID, failed calling card number, failed personal identification number (PIN), or corporate numeric id. Therefore all subprofiles in a given profile should describe analyses which would be appropriate for a single type of key. It would make little sense, for example, to include a geographical velocity subprofile in a profile which has been assigned to a wireline subscriber number. FMS 10, in the absence of other instructions, preferably automatically assigns a profile to any new key it encounters. A sufficient number of profiles should be constructed so that, in addition to those designed for specialized fraud monitoring, a default profile may be designated for each type of key recognized by the system.

Once one or more subprofiles and profiles have been defined by a user, the information may be transferred to FMS 10 using its graphical configuration editors 182. The system then enters these changes real-time without shutting down the system by employing change promotion 186 described above.

It should be understood by those skilled in the art that such is provided only by way of illustrative example and should in no manner be construed to limit the invention as described herein. Numerous modifications and alternate embodiments of the invention will occur to those skilled in the art. Accordingly, it is intended that the invention be limited only in terms of the following claims.

I claim:

1. A computerized fraud detection system for detecting network usage patterns indicative of fraud from at least two disparate networks, each of said networks providing event records resulting from use of the respective network, comprising:

at least one data collector concurrently connected to each of said disparate networks for receiving at least one event record from each of said disparate networks, wherein said event record comprises a plurality of fields;

at least one interface for analyzing each of said at least one received event record to determine its type based on user-defined parameters; and a fraud detection engine for identifying predetermined fields in said at least one analyzed event record to be used as keys, wherein said user pre-selects at least one of any field in said event record to be a key, for measuring usage associated with said key, for summarizing usage statistics against at least one of said keys in said at least one event record, for comparing statistic totals to predefined thresholds, and for responding when said thresholds are met or exceeded.

2. The computerized fraud detection system of claim 1, wherein said event record data is network utilization data.

3. The computerized fraud detecting system of claim 2, wherein said at least two disparate networks are wireline and wireless networks.

4. The computerized fraud detection system of claim 2, wherein said at least two of disparate networks are digital cellular and analog cellular networks.

5. The computerized fraud detection system of claim 2, wherein said at least two of disparate networks are analog cellular and wireline networks.

6. The computerized fraud detection system of claim 1, wherein said means for responding further comprises means for sending an alarm to a user.

7. The computerized fraud detection system of claim 1, wherein said event record data represents voice network utilization.

8. The computerized fraud detection system of claim 1, wherein said event record data represents data network utilization.

9. The computerized fraud detection system of claim 1, wherein said event record data represents video network utilization.

10. The computerized fraud detection system of claim 2, wherein said call detail data is obtained before a call event has completed.

11. The computerized fraud detection system of claim 1, further comprising a database which is consolidated across all of said disparate networks, said consolidated database for storing predetermined ones of said received event record, said measured usage and said summarized usage statistics.

12. A method performed by a computer for detecting network usage patterns indicative of fraud from at least two disparate networks, each of said networks providing event records resulting from use of the respective network, comprising the steps of:

receiving at least one event record from each of said disparate networks with which said computer is concurrently connected, wherein said event record comprises a plurality of fields;

analyzing each of said at least one received event record to determine its type based on user-defined parameters;

identifying predetermined fields in said at least one analyzed event record to be used as keys, wherein said user pre-selects at least one of any field in said event record to be a key;

measuring usage associated with said key;

summarizing usage statistics against at least one of said keys in said at least one event record;

comparing statistic totals to predefined thresholds; and responding when said thresholds are met or exceeded.

13. The method for detecting network usage patterns of claim 12, wherein said step of summarizing occurs over varying periods of time.

14. A method for assisting in fraud analysis, which method is performed by a computer for detecting network usage patterns indicative of fraud from at least two disparate networks, each of said networks providing event records resulting from use of the respective network, comprising the steps of:

receiving at least one event record from each of said disparate networks with which said computer is concurrently connected, wherein said event record comprises a plurality of fields;

analysing each of said at least one received event record to determine its type based on user-defined parameters;

identifying predetermined fields in said at least one analyzed event record to be used as keys, wherein said user pre-selects at least one of any field in said event record to be a key;

measuring usage associated with said key;

summarizing usage statistics against at least one of said keys in said at least one event record;

storing said record, said measured usage, and said summarized usage statistics in a database; and responding to ad hoc queries from a fraud analyst.

15. The method for assisting in fraud analysis of claim 14, further comprising the steps of retrieving a selected event record of network usage, said measured usage or said summarized usage statistics from said database upon request of said fraud analyst; and assigning said retrieved event record of network usage, said measured usage or said summarized usage statistics to a case based on criteria provided by said fraud analyst.

16. The method for assisting in fraud analysis of claim 14, further comprising a step of providing an audit trail.

17. The method for assisting in fraud analysis of claim 14, wherein said database is consolidated across all of said disparate networks.

* * * * *